United States Patent [19]

Lewis

[11] 4,372,847
[45] Feb. 8, 1983

[54] FUEL FILTER ASSEMBLY AND CARTRIDGE

[75] Inventor: Andrew D. Lewis, Livermore, Calif.

[73] Assignee: Chicago Rawhide Manufacturing Company, Elgin, Ill.

[21] Appl. No.: 295,546

[22] Filed: Aug. 24, 1981

Related U.S. Application Data

[63] Continuation of Ser. No. 161,863, Jun. 23, 1980, abandoned.

[51] Int. Cl.³ .............................................. B01D 27/08
[52] U.S. Cl. ...................................... 210/86; 210/114; 210/232; 210/300; 210/315; 210/DIG. 5; 123/510
[58] Field of Search ..................... 210/85, 86, 97, 112, 210/114, 116, 232, 238, 300, 301, 307, 308, 309, 315, DIG. 5; 123/510

[56] References Cited

U.S. PATENT DOCUMENTS

| | | | |
|---|---|---|---|
| 2,295,097 | 9/1942 | Waugh | 210/112 |
| 2,395,301 | 2/1946 | Sloan | 210/DIG. 5 |
| 2,609,932 | 9/1952 | Fricke | 210/DIG. 5 |
| 2,947,419 | 8/1960 | Kasten | 210/DIG. 5 |
| 3,061,107 | 10/1962 | Taylor | 210/DIG. 5 |
| 3,115,459 | 12/1963 | Giesse | 210/DIG. 5 |
| 3,256,988 | 6/1966 | Lanier | 210/DIG. 5 |
| 3,256,997 | 6/1966 | Pall | 210/DIG. 5 |
| 3,262,572 | 7/1966 | Cook | 210/DIG. 5 |
| 3,312,351 | 4/1967 | Kasten | 210/DIG. 5 |
| 3,935,106 | 1/1976 | Lipner | 210/232 |

Primary Examiner—Ernest G. Therkorn
Attorney, Agent, or Firm—James T. FitzGibbon

[57] ABSTRACT

A fuel filter assembly and cartridge for filtering, coalescing and separating solids, liquids, and gases from a fluid flow including a housing adapted to a removable cartridge. The cartridge is in the form of an annular member having an outer annular filtering section to remove solids an an inner annular coalescing section to cause emulsified liquids to form readily removable droplets in the flow. A separator is situated within the inner periphery of the coalescing section to deflect coalesced liquid for separation while permitting passage of the purified fluid.

13 Claims, 10 Drawing Figures

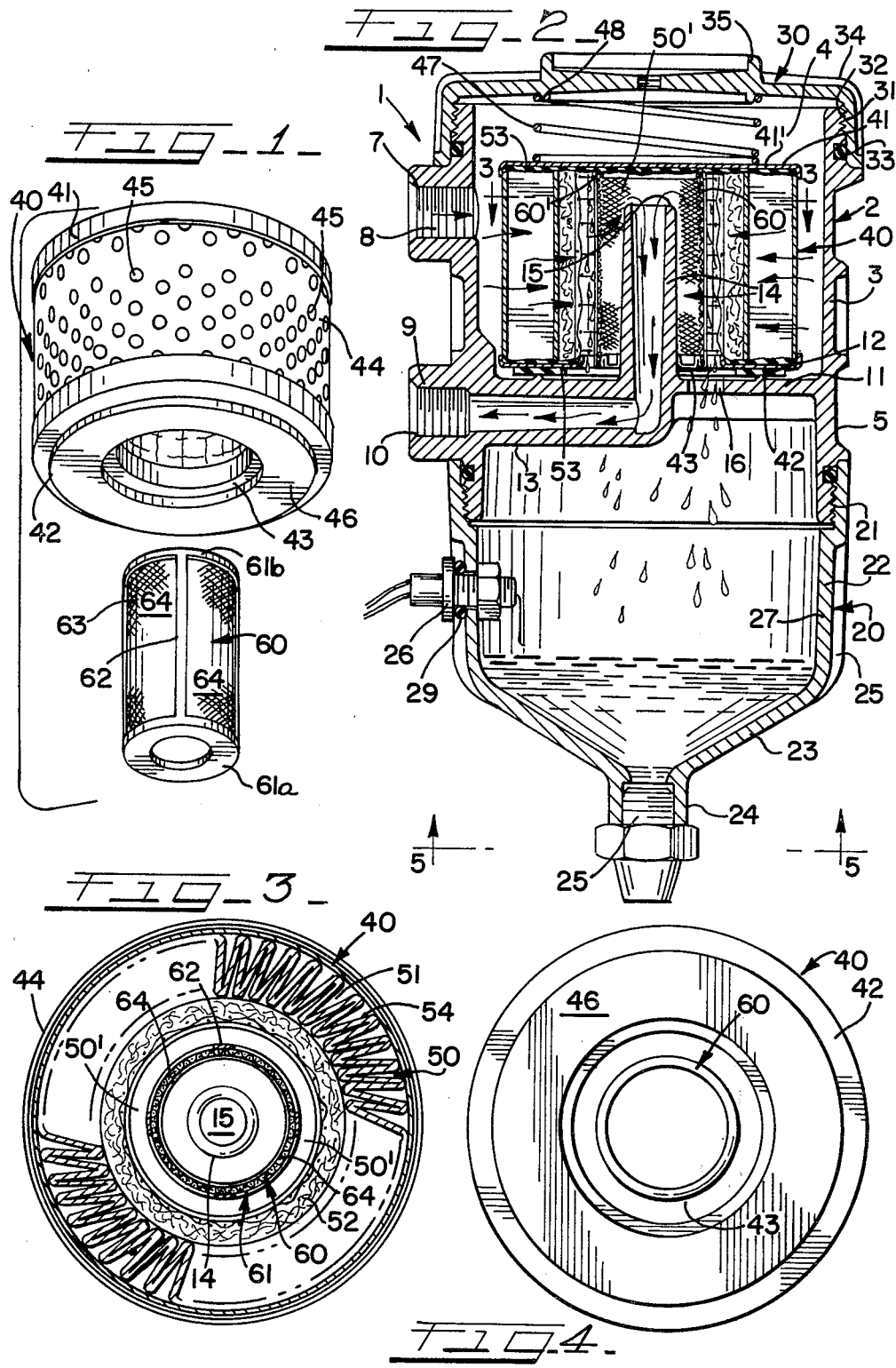

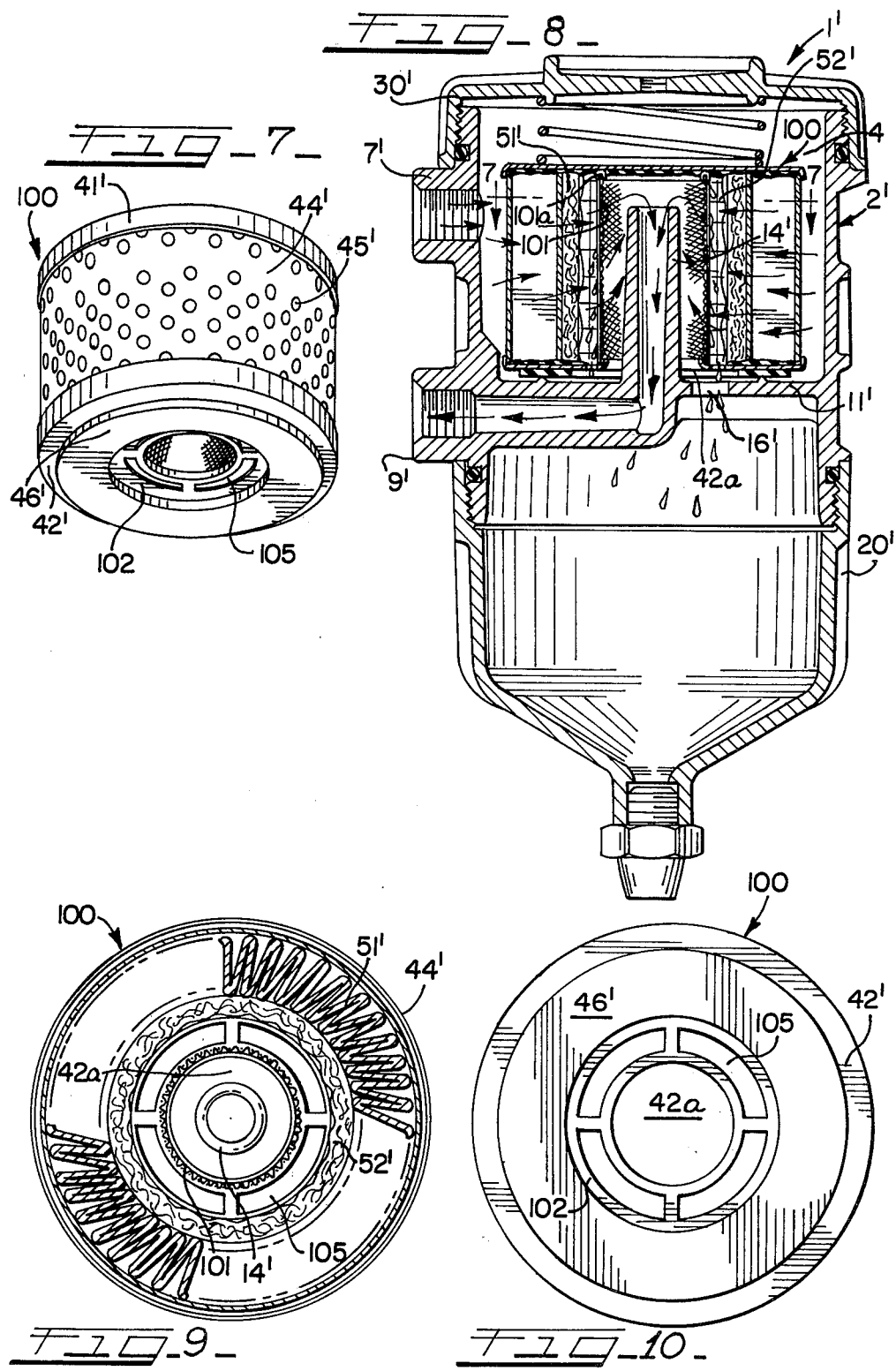

FUEL FILTER ASSEMBLY AND CARTRIDGE

This is a continuation of application Ser. No. 161,863, filed June 23, 1980, now abandoned.

BACKGROUND OF THE INVENTION

The invention relates in general to filtration and liquid/liquid and gas/liquid separation, and in particular, to an assembly for removing solids, liquids and/or gases from a liquid or gas flow.

More specifically, without restriction to the particular use which is shown and described, this invention relates to an improved filter assembly and cartridge to subject a liquid or gas to filtering, coalescing, and separation to remove solids, emulsified liquids and/or gases therefrom. The invention of the application includes a replacable cartridge capable of superior filtering and separation to return a purified liquid or gas to a fluid system.

In numerous situations, a continuous liquid or gas phase is subject to the accumulation of contaminants in the form of solid particles, liquids and/or gases, which must be subjected to filtration and separation as attempted by numerous techniques of the prior art. The contaminating material may, for example, be present as a solid, liquid, or gas within a gas media, or dispersed as a solid, liquid or gas within a liquid. In one specific situation, the presence of foreign matter is prevalant in the fuel system used in conjunction with vehicle engines of many types. The oil in the fuel system of a diesel engine is particularly vulnerable to the presence of contaminants. Such contaminants in diesel fuel may be in the form of solids, such as dirt, rust particles and the like, or constitute water existing as a dispersed phase within the fuel. Fuels, such as diesel oil, demonstrate a natural affinity to water, because of which water is commonly emulsified within the fluid. The normal turbulent nature of a conventional pump acting to deliver fuel to the engine contributes to the emulsified nature of the water particles within the continuous fuel phase. This widely dispersed liquid is generally difficult to separate from the fluid in such an emulsified state. The presence of contaminating solids and dispersed liquids within the continuous fuel phase is capable of interfering with the efficient operation of the engine and require removal from the fuel.

Many devices have been employed in the prior art in an effort to effectively remove or reduce the amount of contaminating solids, liquids and/or gases, present in liquids or gas, such as, for example, in the form of diesel oils and the like. One type of well known purifying technique used in conjunction with the fuel line of a vehicle applies filtering elements as a means to purify the fuel for satisfactory utilization by the engine. Filtration alone, however, is not effective in removing the contaminating liquids dispersed throughout the fuel, although filtering can, in certain situations, be effective for removing solids. Other prior art devices have been directed to centrifugal type systems by which separation of contaminants from the fuel is obtained by subjecting the fluid to a swirling action. Although such techniques are capable of a degree of satisfactory separation of foreign material from a fluid, these devices do not offer an efficient and relatively inexpensive approach to the problem of removal of contaminants.

Many devices in the prior art have relied upon the phenomenon of coalescing dispersed liquid from a fluid as a means to overcome the problems inherent in the accumulation of liquid in a fuel line. Such coalescing devices rely on a coalescing material to coalesce the liquids into droplets which are more readily separated from the fuel than in the dispersed state. The prior art coalescing devices have been deficient in providing an economical and trouble free device that is capable of highly efficient removal of dispersed liquids in all demand ranges of the vehicle engine. Some of the prior art devices may operate satisfactory at low flow rates through the separator, but as the engine output increases, the flow rate becomes greater and efficiency of coalescing and separation then suffers in such devices resulting in water particles, and the like, being delivered to the engine. The overall deficiency of such coalescing systems has resulted, in part, from the ineffective cooperation between the incoming flow and the coalescing stage.

Moreover, known coalescing-type apparatus have failed to provide or not provided sufficient filtration of solids prior to entry to the coalescing stage, because of which the coalescing operation becomes less efficient due to the interfering presence of solids. The prior art coalescing devices have not further provided effective filtration and separation at all flow rates through the separator, with a resulting decrease of efficiency. Accordingly, the known techniques of filtering and separating contaminants from a fluid, such as a diesel oil and the like, have not attained the optimum level of efficiency to accomplish removal of solids, dispersed liquids and gases from a fuel at all demand levels of the engine.

SUMMARY OF THE INVENTION

It is, therefore, an object of the present invention to improve the filtration and separation of solids, liquids and/or gases from a liquid or gas media.

A further object of this invention is to provide a fluid filter assembly having a removable cartridge which is capable of effective removal of solids in the fluid.

Another object of this invention is to provide a fuel filter assembly and removable cartridge by which dispersed liquids and/or gases are separated from a gas or liquid.

A still further object of this invention is to attain effective filtration, coalescing, and separation of solids, liquids, and gases from a fluid by passing through a filtering and coalescing media in an inward radial direction.

Still another object of this invention is to provide an improved fluid filter assembly having a readily replaceable cartridge assembly capable of an extended lifetime of service.

Still another object of this invention is to provide a fluid filter assembly which includes a separator to insure that coalesced liquids are substantially removed from the fuel.

A still further object of this invention is to provide a fuel filter assembly and cartridge which effectively collects coalesced liquids separated from the fuel.

These and other objects are attained in accordance with the present invention wherein there is provided an improved fluid filter assembly and cartridge for removing solids, liquids, and/or gas from a fluid media, such as a liquid or gas. The invention of the application may be utilized in a variety of applications where separation and removal of solids, liquids and/or gases from a continuous liquid or gas phase is necessary. Although the invention may be used to filter solids and separate a liquid from a fuel, the fluid filter assembly and cartridge herein disclosed may also be used to accomplish two, three or four phase liquid separation, gas/liquid separation or gas filtration, as conditions dictate. For example, the invention may be employed to remove solids and/or moisture or other liquid from a gas, such as air being supplied to a pneumatic compressor, to remove contaminating liquids or gases in natural gas, propane and the like, to remove oil or other contaminating liquid from bilge water, and numerous other particular applications.

In a specific use of the invention, the fuel filter assembly and cartridge is adapted to be attached to the fuel line of a vehicle. In such use, contaminated fuel is directed in a substantially radially inward direction through an annular cartridge means having filtering and coalescing stages. The filtering stage of the invention effectively removes and retains solids from the flow and introduces fuel, free of solids, radilly through the coalescing stage. In the coalescing stage, emulsified liquids, such as water and the like, agglomerate to form droplets which increase in size during inward movement. The dispersed liquid is thus transformed in the coalescing stage of the invention into a physical state of sufficient size and weight to be separated from the fuel and collected in a containment vessel as needed during operation of the vehicle. A separator is positioned in operative relationship to the coalescing stage to insure complete separation of the coalesced liquid from the fuel, even at higher flow rates through the filter assembly.

The separator of the fuel filter assembly and cartridge herein disclosed is impermeable to any coalesced liquid carried by the fuel and acts to deflect agglomerated water away from its surface to be collected by the containment vessel. At the same time, the separator is fuel permeable to permit the fuel to flow unimpeded to the outlet of the assembly. Through its filtering, coalescing, and separating functions, the invention of the application achieves greatly improved removal of foreign substances from the fuel system of an engine, or in other uses where such efficient filtration and separation is desirable.

BRIEF DESCRIPTION OF THE DRAWINGS

Further objects of the invention, together with additional features contributing thereto and advantages accruing therefrom, will be apparent in the following description of preferred embodiments of the invention, which are shown in the accompanying drawings wherein like reference numerals indicate corresponding parts throughout, wherein:

FIG. 1 is a perspective exploded side view of a first embodiment of a cartridge having a separable separator member for use in the fuel filter assembly and cartridge of the invention;

FIG. 2 is a side sectional view of the fuel filter assembly of the invention employing the cartridge of FIG. 1;

FIG. 3 is a sectional top view of the cartridge assembly of FIG. 1 within the fuel filter assembly taken along lines 3—3 of FIG. 2;

FIG. 4 is a bottom schematic view of the cartridge assembly of FIG. 1 with the separator member in an inserted position therein;

FIG. 7 is a perspective side illustration of another embodiment of a cartridge for use in the fuel filter assembly and cartridge of the invention;

FIG. 8 is a side sectional view of the fuel filter assembly and cartridge of the invention employing the modified cartridge of FIG. 7;

FIG. 9 is a top sectional view of the fuel filter assembly and cartridge taken along lines 7—7 of FIG. 8; and FIG. 10 is a bottom schematic view of the cartridge of FIG. 7 used in the fuel filter assembly and cartridge of FIG. 8.

DESCRIPTION OF THE PREFERRED EMBODIMENTS

Figure 5:
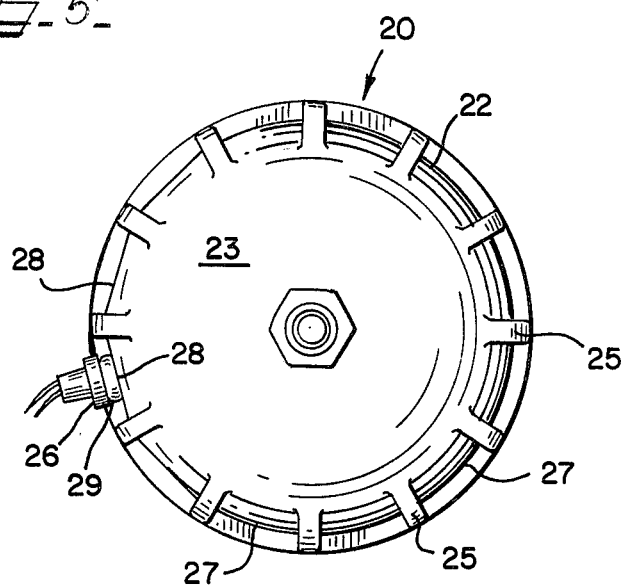
FIG. 5 is a bottom schematic illustration of the containment vessel of the fuel filter assembly and cartridge of the invention taken along lines 5—5 of FIG. 2.

Referring to FIGS. 1 to 6, there is illustrated a first embodiment of the improved fluid filter assembly and cartridge of the invention, generally designated by reference numberal 1. The fluid filter assembly 1 is capable of highly effective filtering, coalescing and separation to remove particles, liquids, and gases from a fluid such as, for example, the fuel in the fuel system of an engine for an automobile, truck, off-highway vehicle, aircraft, marine craft, and the like, or other applications, apart from fuel systems, involving marine, industrial or other uses.

Although the fluid filter assembly and cartridge 1 is described for purposes of illustration for use to remove impurities from the fuel supplied to a vehicle engine, it should be understood that the invention of the application is not limited to such exclusive use and may be utilized in numerous other applications where removal of contaminants and the like, in the form of dispersed particles, liquids and/or gases, from a liquid or gas is desirable. The invention may purify natural gas, propane, bilge water, air in pneumatic systems, and the like, in which unwanted solids, liquids, or gases may be carried. The invention of the application is further not limited to single phase separation, but may be used in a situation where two, three or four phase liquid separation, gas liquid separation or gas filtration is required.

In the specific use disclosed herein, fluid filter assembly 1 in the form of a fuel filter and cartridge, includes a body 2 having an upper wall 3 in the form of a surface of revolution to define a cartridge receiving chamber 4 therein. An integral lower cylindrical wall 5 is coupled to the upper wall 3 and is adapted to be attached to a containment vessel or bowl in a manner to be described. The walls 3 and 5 may be constructed from any suitable material, such as, for example, a metal, plastic, and the like. An inlet port 7 is formed through a portion of the upper wall 3 and is provided with internal threads 8 to permit the inlet port to be coupled to a conduit of the fuel system (not shown) of a vehicle to introduce a flow of fuel, having contaminants to be removed, into the cartridge receiving chamber 4. Although the fuel filter assembly 1 may be employed in conjunction with the fuel system of any internal combustion engine, the invention of the application is particularly useful in removing foreign material from the diesel oil for a diesel engine. Diesel fuel is particularly subject to contamination due to the presence of solid material in the form of dirt, rust, and the like, and emulsified liquids such as water, generally having a different specific gravity than the diesel fuel. The contaimanted fuel is normally delivered to the inlet port 7 through the action of a conventional fuel pump (not shown) forming a component of the engine fuel system. The flow rate through the unit is established by the fuel pump in conjunction with the instantaneous fuel requirements of the engine.

An outlet port 9 is provided beneath the inlet port 7 through a portion of the lower wall section 5 and is similarly provided with internal threads 10 permitting attachment to another conduit of the fuel system to direct purified fuel to a utilization point, generally to be supplied to the engine during its operation. The bottom of the cartridge receiving chamber 4 is defined by a horizontal wall 11, formed with an upper annular shaped ridge 12, circumferentially extending about the vertical axis of the body 2. An outlet passage 13 is integrally coupled to the underside of the lower wall 12 in fluid communication with outlet port 9. The outlet passage 13 creates a fluid passage laterally of the body 2 to a point adjacent its vertical center line. An integrally formed standpipe 14 extends upward through the lower wall 11 to a position in an upper portion of the cartridge receiving chamber 4. The standpipe 14 creates a fluid passage in communication with outlet passage 13 and is provided with a standpipe inlet port 15 through which the flow of fuel, having been purified in a manner to be described herein, is directed downward through the standpipe 14 and laterally through passage 13 for egress from port 9 for utilization in the vehicle engine.

Figure 6:
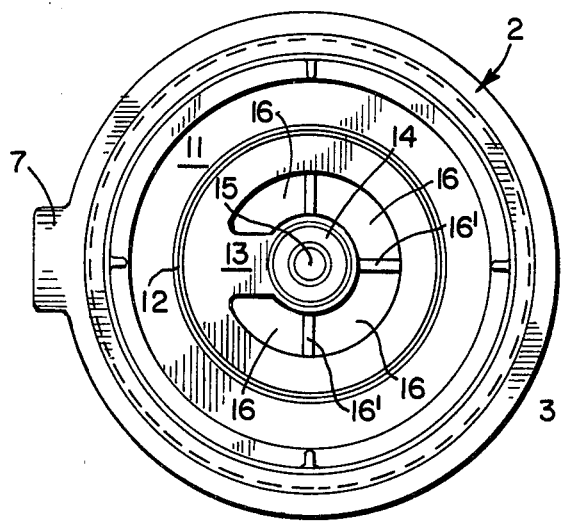
FIG. 6 is a top schematic illustration of the fuel filter assembly of FIG. 2 with the cartridge and body cap member removed.

A plurality of containment vessel ports 16 in the form of arcuate, open segments are disposed about standpipe 14 through bottom wall 11 as best shown in FIGS. 2 and 6. Each of the ports 16 is separated by respective narrow portions 16' of the bottom wall 11 and extend about the vertical centerline of the body 3 from points adjacent opposite sides of flow passage 13. The ports 16 provide drainage openings for the liquid separated from the fuel in the cartridge receiving chamber 4 during use of fuel filter assembly 1 of the invention. A containment vessel or bowl 20 is removably attached by a threaded coupling 21 to the bottom end portion of the wall 5, whereby the coupling 21 may be sealed through the use of a suitable elastomeric O-ring 22 and the like. The containment vessel 20 may be constructed from numerous materials, such as, for example, plastic, steel, bronze, and the like.

As best shown in FIGS. 2 and 5, the containment vessel 20 includes an upper cylindrcial portion 22 and a lower frusto-conical bottom wall 23, which terminates with an outlet neck 24 fitted with a suitable drain plug or valve 25. Plug 25 permits drainage of the liquid collected in the interior chamber formed by containment vessel 20. Although the drain plug 25 is illustrated as a conventional, manually operated drain valve capable of alternatively blocking or draining liquid through outlet neck 24, it is within the scope of the invention to fit the outlet neck 24 with an automatically operated valving mechanism controlled by a suitable liquid level detector disposed within containment vessel 20 of the type as will be described.

The containment vessel 20 may manually or automatically be drained through neck 24 on a periodic basis upon a predetermined quantity of liquid being collected. As shown in FIG. 2, a conventional conductivity probe 26 may be disposed through the upper portion 22 of the containment vessel 20 to provide the vehicle operator with a visual or audio signal, through suitable circuitry (not shown), that a predetermined level of liquid within the containment vessel has accumulated requiring drainage. Alternatively, the probe 26 may be coupled to an electrical circuit (not shown) which applies an electrical signal to an automatically operated drain valve (not shown) positioned in outlet neck 24 to open and close the valve as conditions dictate. The amount of fluid collected in containment vessel 20 may be also determined visually, when the containment vessel 20 is constructed of a transparent material. It is further within the scope of the invention to use other types of well known liquid level detectors within vessel 20, other than the conductivity probe 26 as illustrated in FIG. 2.

As shown in FIG. 5, the upper cylindrical portion 22 of the containment vessel 20 is formed by a plurality of downwardly disposed rib sections 26 interconnected by a plurality of wall segments 27. Although a majority of the segments 27 possess a curved cross-sectional configuration, one or more segments 28 possess a flat shape. The flat surface created by the one or more segments 28 achieves improved sealing relationship between conductivity probe 26 and the wall of the containment vessel 20, by insuring positive contact between the wall of segment 28 and an O-ring 29 and the like employed as a seal for the mounting of the probe.

The top of housing assembly 2 is covered by a cap member 30 having a dome-shaped configuration. A plurality of lower threads 31 are formed within the downward extending portion of cap member 30 and are adapted to engage threads 32 formed on the periphery of the upper portion 3 of the body 2. The cap 30 may be removed to provide access to the cartridge chamber 4 to permit removal and replacement of the cartridge mounted therein as needed during use of the device. The sealing relationship between the cap 30 and body 2 is enhanced by a suitable O-ring 33 positioned adjacent the threaded coupling therebetween. The dome-shaped cap 30 is provided with a number of outer rib sections 34 extending from an upper rim 35 of the cap 30 downward to near its bottom edge. The ribs 34 act to facilitate manual removal of the cap member 30, as needed to replace a cartridge in the cartridge chamber 4.

A unitary cartridge assembly 40, which is capable of filtering and/or coalescing contaminating solids, liquids, and gases from the fuel, is designed to be removably received in cartridge chamber 4 within the body 2. The cartridge assembly 40 is in the form of an annular member having filtering and coalescing sections as will be described. The cartridge assembly 40 is adapted to be inserted and removed from the body 2 through the opening normally closed by the cap member 30, as shown in FIG. 2. The cartridge assembly includes an upper cartridge cap 41 forming a continuous surface 41' and a bottom annular cap 42 creating a central opening 43 through which the standpipe 14 extends upward. The outer circumferential wall of the cartridge assembly 40 is defined by a surface of revolution 44 in the form of a paper shell or similar material. The shell 44 includes a plurality of perforations 45 situated at selected positions around the entire circumference of the shell 44 to form multiple, circumferentially disposed inlets to the cartridge assembly 40 for the flow of fuel introduced through inlet 7.

The bottom cap 42 of the cartridge assembly 40 includes an elastomeric annular gasket 46, which is biased in sealing contact against the annular rim 12 formed on the bottom wall 11 of the body 2. The cartridge assembly 40 is biased downward into position in cartridge chamber 4 and into contact with the rim 12 by means of a compression spring 47. The spring 47 is disposed between the upper cartridge cap 41 and the bottom of the cap member 30, having an annular spring retention lip 48 as shown in FIG. 2. The spring 47 may be of any type of compression spring capable of holding the cartridge assembly 44 down in the biased position illustrated in FIG. 2.

The cartridge assembly 40 includes an annular body 50 disposed within the shell 44, such that fluid introduced through perforations 45 is directed radially inward through the annular body 50 to filter and coalesce impurities. The annular body 50 of the cartridge assembly 40 surrounds a central chamber 50' in which the standpipe 14 is disposed with standpipe inlet 15 being at an upper portion thereof. The central chamber 50' is in fluid communication with containment vessel 20 through ports 16 to drain coalesced liquid separated from the flow of fluid. The annular body 50 is formed by an outer filtering section 51 and an inner coalescing section 52 which are arranged in concentric, substantially contacting relationship with each other. The ends of the shell 44, filtering section 51, and coalescing section 52 are affixed to the upper cartridge cap 41 and lower cartridge cap 42 by the use of a suitable adhesive 53, such as epoxy and the like, to form a unitary cartridge structure.

The filtering section 51, which is situated immediately adjacent the perforated paper jacket 45, is formed by a pleated filter media 54 extending circumferentially about the vertical centerline of body 2 and is capable of removing and retaining solid particles present in the flow of diesel oil and the like. The pleated filtering media comprises a conventional filtering material, such as a porous paper treated with a silicone substance and the like, to render the filter paper hydrophobic in nature. The filter media is capable of filtering and retaining solids from the fuel flow and may be constructed to provide filtration in a predetermined range, such as coarse filtration, fine filtration, or absolute filtration from a large micron size and below.

After passing through the filtering section 51 where solids are filtered from the flow, the fuel is passed substantially in a radial inward direction through coalescing section 52. The coalescing section 52, also having an annular configuration, is situated in actual or near abutting relationship to the inner surface of the outer filtering section 51. The coalescing section 52 is formed from any coalescing material that causes emulsified water or other fluids, generally having a different specific gravity than the fuel, to coalesce and form droplets which increase in size during inward travel through the coalescing media. Typically, such coalescing material causes emulsified liquid particles, dispersed in the continuous fluid phase, to agglomerate and form droplets which increase in size during inward travel through the coalescing section 52. The droplets of water and the like formed in coalescing section 52, either fall by gravity to the bottom of the chamber 50' or are carried radially inward from the coalescing section 52 by the flow of fuel. The droplets carried by the fuel flow inward are separated therefrom in the invention of the application by a separator member 60, which prevents passage of the coalesced liquid, but permits passage of the contaminant free fuel oil and the like. Generally, many heavier droplets of water fall to the bottom of the chamber without contact with the separator member 60, particularly under low rate conditions, while the lighter droplets may be carried by the flow to the separator member. However, higher flow rates through the fuel assembly 1, induced by the fuel pump acting to meet increased demands of the engine, tend to carry some of the even heavier droplets into contact with the separator member 40.

As best shown in FIGS. 1, 2 and 3, the separator member 60 comprises an annular structure separably coupled to the cartridge assembly 40 in engagement means 60' carried thereby. The separator member 60 is disposed in concentric relationship to standpipe 14 within chamber 50' and is supported by the inner periphery of a lower ring member 61a of member 60 frictionally engaging a portion of the standpipe 14 to suspend the separator member in the position shown in FIG. 2. The outer periphery of the separator member 60 is spaced from the inner surface of the coalescing section 52 and is spaced from the outer periphery of standpipe 14 as shown in FIG. 2. The separator member 60 includes an annular frame having ring member 61a and an upper ring member 61b interconnected by a plurality of spaced longitudinal reinforcing segments 62 forming peripheral openings 63. The positioning of top ring 61b in engagement means 60' of cartridge cap 41 and lower 61a in frictional engagement on standpipe 14 substantially blocks fluid communication through the upper and lower end of the separator member 60. The openings 63 are covered by fine mesh screen elements 64 formed by a separating hydrophobic media, such as metal, plastic, treated paper or similar material capable of preventing the droplets of coalesced liquids from passing therethrough, but being permeable to the passage of the fuel therethrough. The screen 64 separates the droplets of liquid contacting the separator member 60 from the fuel by deflection and causing the agglomerated liquid to fall by gravity downward in chamber 50' between the cartridge assembly 40 and the separator member 60 as shown in FIG. 2. The droplets thus drain from chamber 4 through ports 16 into containment vessel 20 after passing through the screen element 64. The purified fuel flows upward through standpipe inlet 15 to outlet port 9 for delivery to the vehicle engine.

In operation, a flow of fuel is introduced through the inlet port 7 by the action of the engine fuel pump. The fuel may carry emulsified liquids, such as water and the like, and particulate materials in the form of rust, dirt and similar solids. The fluid entering the inlet 7 substantially fills the chamber surrounding cartridge assembly 40 and is directed radially through the outer perforated shell 44 of the cartridge. The fuel passes in a substantially inward direction through the filtering section 51, in which stage the solids are removed from the fluid and retained by the filtering media. The remaining fuel, containing emulsified contaminants, such as water, then passes through the coalescing section 52. Coalescing section 52 acts to coalesce the liquids dispersed in the continuous fuel phase to agglomerate and form droplets which become larger in size during travel through the coalescing section.

The heavier droplets fall by gravity to the bottom cartridge chamber 4 while the remaining droplets contact the screen 64 of the separator member 60. The number of droplets actually contacting the separator member 60 is largely dependent on the flow rate through the filter assembly 1 and other conditions. The coalesced liquid is deflected by the hydrophobic screen elements 64 and falls downward to be drained into the containment vessel 20 through ports 16. The purified fuel, which is permitted to pass through the separator member 60, enters the space about the standpipe and flows through the standpipe inlet 15 and downward to the outlet port 9 for delivery to the vehicle engine. Thus, the solids in the fuel are removed by the filtering section 51 while the liquid contaminants form droplets in coalescing section 52 that are separated from the fuel flow by gravity and the aid of the separator member 60, if in contact therewith.

Referring now to FIGS. 7 through 10, there is illustrated another embodiment of the fuel filter assembly and cartridge of the invention which utilizes a modified cartridge 100. The fuel filter assembly 1' of the embodiment of FIGS. 7 through 10 is provided with substantially the same structural components accomplishing the same functions as that described in connection with the preceding embodiment of FIGS. 1 to 6. Fuel filter assembly 1 includes body 2', containment vessel 20', upper cap 30', bottom wall 11' having ports 16', standpipe 14' and other identical parts to the preceding embodiment. The fluid flow through the filter assembly 100 is identical to that disclosed in relation to the invention of FIGS. 1 through 6, with the fuel flowing into port 7' and egressing from outlet port 9'.

The modified cartridge assembly 100 of the embodiment of FIGS. 7 through 10 is formed with an integral separator member 101 to separate coalesced liquid from the fuel by performing the same function as separator member 60 of FIGS. 1 to 6. The cartridge assembly 100 of FIGS. 7 through 10 includes an upper cap 41' and a lower cap 42' having a gasket 46', similar to that described with reference to the cartridge assembly 40 of the preceding embodiment. The outer periphery of the cartridge assembly 100 of the embodiment of FIGS. 7 through 10 is defined by an annular continuous perforated sheet 44' surrounding an annular filtering section 51' having a pleated filter media. The coalescing section 52' of the cartridge assembly 100 is also situated adjacent the filtering section 51' and includes a suitable coalescing material.

The lower annular cap 42' forms a standpipe receiving opening 42a and supports the separator member 101 by means of an inner upturned end portion 102 as shown in FIG. 7, such that the separator 101 is carried as an integral part of the cartridge assembly 100. The upper portion of the outer shell 44', filtering section 51', and coalescing section 52' are affixed by an adhesive to the underside of the upper cap 41', along with a retention element 101a which receives the upper end of separator member 101. The separator member 101 is integrally situated in the unitary cartridge assembly 100 at a position spaced from the inner surface of coalescing section 52' to permit effective separation of the coalesced liquid. The droplets of coalesced liquid created in the coalescing section 52' drop downward in chamber 4 in a similar manner as the preceding embodiment. A plurality of drainage segments 105 are provided in lower cap 42', and are arranged beneath the falling droplets to permit the coalesced liquid to drain downward to the ports 16' for collection in the containment vessel 20'. The purified fuel then flows to the standpipe inlet 15' and downward through the standpipe for delivery to the engine in a manner as previously described.

In the foregoing description, the invention of the application has been described in detail as a single unit to remove impurities from a fuel. The fluid filter 1 may also be employed as a fuel filter or other use with additional units (not shown) mounted in parallel or other relationship to each other to function simultaneously or alternatively, in a sequential mode as each fluid filter becomes incapable of further filtration or separation after extended use. In the latter sequential operation of a plurality of units of the invention, suitable manual or automatic flow control means, may be relied upon to deliver or cease delivery to a particular assembly.

The fluid filter assembly may also comprise a large unit having a plurality of separate internal filtering, coalescing, and separating components of the type described with reference to the preceding embodiments. In addition, in certain applications, the filter assembly 1 can be operated in a manner, such that contaminants separated are removed through the outlet while the utilized flow is directed through the bottom of the filter assembly. Such modification may be utilized in particular situations, such as, for example, to remove contaminating oil from bilge water being discharged into a natural body of water and the like.

While the invention has been described with reference to the preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. An assembly for removing contaminants from a fluid comprising
   housing means forming a fluid receiving chamber,
   said housing means having an inlet port for introducing a continuous fluid phase having particulate material and emulsified liquids to be removed to said fluid receiving chamber,
   said housing means having an output port to direct the fluid to a utilization point,
   cartridge means operatively positioned in said fluid receiving chamber and adapted to be selectively removed for replacement,
   said cartridge means having at least two concentrically arranged annular sections to receive the fluid introduced through said inlet port in successive order and in a substantially radial inward direction,
   the outer section of said annular sections including filtering means to filter the particulate material from said fluid introduced through said inlet port, said filtering means having a filter media disposed therein,
   the inner section of said annular section including coalescing means to coalesce the emulsified liquids in said continuous fluid phase, said coalescing means having a coalescing material to cause said emulsified liquid to coalesce into droplets in the continuous fluid phase,
   a separator assembly having an annular fine mesh screen, said screen being concentrically arranged within said coalescing means in spaced relationship thereto,
   said separator preventing the passage of the droplets formed by said coalescing section and permitting the continuous fluid phase to pass therethrough,
   said cartridge means being solely supported in substantially spaced relationship to said housing on an annular raised position creating sealed contact between the bottom of said cartridge means and said housing, containment means coupled in fluid communication beneath said housing means to collect the coalesced liquid, fluid passage means positioned within said separator and being in fluid communication with said outlet port to direct the continuous fluid phase passing through said separator to a utilization point, and said fluid passage means includes a standpipe disposed within said separator assembly in concentric spaced relationship to said fine mesh screen.

2. The assembly according to claim 1 wherein the emulsified liquids are carried in a fluid having a different specific gravity.

3. The assembly according to claim 1 wherein said filter material is in the form of pleated paper treated with a hydrophobic substance.

4. The assembly according to claim 1 wherein said coalescing material includes a fiberglass material.

5. The assembly according to claim 1 wherein said separator is integrally coupled to said cartridge means.

6. A fuel filter and separator assembly comprising housing means forming a fuel filter and separator chamber, said housing means having an inlet coupled to the fuel system on a vehicle to introduce a flow of fuel into said chamber subject to the presence of solid and liquid contaminants, said housing means further having an outlet to deliver the fuel to an engine, cartridge means removably mounted in said chamber, said cartridge means having an outer annular filter section and an inner concentrically arranged coalescing section, said flow of fuel introduced into said inlet being adapted to be directed substantially radially inward through said filter section to remove the solid contaminants and through the coalescing section to coalesce the liquid contaminants into droplets, an annular liquid separator concentrically disposed within said cartridge means in spaced relation thereto and defining an inner fuel receiving chamber, said separator preventing the passage of coalesced liquids therethrough and permitting passage of the fuel, said separator having a substantially annular screen, said annular screen being operatively affixed to a lower base member having a central opening, containment means coupled to said housing means beneath said cartridge means and said separator to receive and collect said droplets, fluid passage means in fluid communication with said fuel receiving chamber and coupled to said outlet to direct substantially contaminant free fuel to the engine, said fluid passage means includes a standpipe disposed concentrically within said opening of said separator, and said annular screen being spaced from said standpipe with said base member in contact with said standpipe to provide substantially sole support of said separator apart from said cartridge.

7. The fuel filter and separator assembly according to claim 6 wherein said separator is an annular member having substantial portions in the form of a screen element being impermeable to coalseced liquids and permeable to the fuel.

8. The fuel filter and separator assembly according to claim 6 wherein said separator is integrally attached to said cartridge means.

9. The fuel filter and separator assembly according to claim 6 wherein said housing means includes a removable top to provide access to said cartridge means in said fuel filter and separator chamber.

10. A removable cartridge for use within a housing of a fuel filter assembly comprising an annular outerfilter section and an inner coalescing section concentrically arranged in substantially contact relationship within said filter section thereto, said filter and coalescing section defining a central chamber, a perforated shell disposed in surrounding relationship to said annular outer section to form an outer surface to receive an incoming flow of fluid, an upper cap member being affixed to a first end position of said perforated shell, said filter section, and said coalescing section to enclose an end of said chamber, said cap member having means affixing said perforated shell, said filter section, and said coalescing section in integral relationship thereto, a bottom member affixed to the end portion of said perforated shell, said filter section, and said coalescing section and having a central opening in fluid communication with said chamber, said bottom cap member having flat annular sealing means adapted to create sealing relationship between the cartridge and a raised portion of the housing of the fuel filter assembly, said filter section being formed by pleated filter material treated with a water repellent substance, and said coalescing section includes a coalescing material to cause liquid contaminants in the fuel introduced radially inward through said coalescing section to coalesce therefrom for separation.

11. The removable cartridge according to claim 10 further including annular separator means concentrically arranged within said filter section and said coalescing section, said separator means being supported by said bottom cap member.

12. The removable cartridge according to claim 11 wherein said separator means includes a fine mesh screen deflecting passage of the coalesced liquid and permitting passage of the fuel.

13. A fuel filter and separator assembly comprising housing means forming a fuel filter and separator chamber, said housing means having an inlet coupled to the fuel system of a vehicle to introduce a flow of fuel into said chamber subject to the presence of solid and liquid contaminants, said housing means further having an outlet to deliver the fuel to an engine, cartridge means removably mounted in said chamber, said cartridge means having an outer annular filter section and an inner concentrically arranged coalescing section, said flow of fuel introduced into said inlet being adapted to be directed substantially radially inward through said filter section to remove the solid contaminants and through the coalescing section to coalesce the liquid contaminants into droplets, an annular liquid separator concentrically disposed within said cartridge means in spaced relation thereto and defining an inner fuel receiving chamber, said separator preventing the passage of coalesced liquids therethrough and permitting passage of the fuel, said housing means having a lower floor defining a portion of said chamber, said floor having an upper annular raised portion, containment means coupled to said housing means beneath said cartridge means and said separator to receive and collect said droplets, fluid passage means in fluid communication with said fuel receiving chamber and coupled to said outlet to direct substantially contaminant free fuel to the engine, said containment means includes a vessel having a plurality of wall portions separated by a plurality of downwardly extending rib sections, said wall portions defining at least a portion of the peripheral wall of said vessel, some of said wall portions having a curved cross-sectional configuration, and at least one of said wall portions including a flat configuration adapted to mount a level detector through said vessel in sealed relationship thereto.

* * * * *